United States Patent [19]
Liikanen et al.

[11] Patent Number: 5,699,406
[45] Date of Patent: Dec. 16, 1997

[54] ARRANGEMENT FOR SECURING THE SIM CARD IN A MOBILE TELEPHONE

[75] Inventors: Petteri Liikanen, Turku; Jouni Nyqvist, Muurla, both of Finland

[73] Assignee: Nokia Mobile Phones Ltd., Salo, Finland

[21] Appl. No.: 521,355

[22] Filed: Aug. 30, 1995

[30] Foreign Application Priority Data

Sep. 7, 1994 [FI] Finland ............................. 944109

[51] Int. Cl.$^6$ .................................................. H04Q 7/32
[52] U.S. Cl. ........................ 379/58; 379/58; 379/428; 379/357; 455/89; 455/90
[58] Field of Search ...................... 379/58, 257, 430, 379/433, 428; D14/144, 146, 217, 240, 252, 256, 142, 138, 253; 235/380, 382.5, 441, 379; 455/89, 90

[56] References Cited

U.S. PATENT DOCUMENTS

| | | | |
|---|---|---|---|
| 4,677,657 | 6/1987 | Nagata et al. | 379/257 X |
| 5,319,525 | 6/1994 | Lightfoot | 361/760 |
| 5,335,273 | 8/1994 | Takagi et al. | 379/433 |
| 5,371,791 | 12/1994 | Schwartz et al. | 379/433 |
| 5,404,580 | 4/1995 | Simpson et al. | 455/89 |
| 5,436,969 | 7/1995 | Kobayashi | 379/433 |
| 5,615,250 | 3/1997 | Kobayashi | 379/357 X |
| 5,615,260 | 3/1997 | Kurgan | 379/433 |
| 5,615,388 | 3/1997 | Yoshimatsu et al. | 235/380 X |
| 5,628,031 | 5/1997 | Kikinis et al. | 455/89 X |
| 5,633,490 | 5/1997 | Vandenengel | 235/441 X |

FOREIGN PATENT DOCUMENTS

| | | |
|---|---|---|
| 0505931 | 9/1992 | European Pat. Off. . |
| 0616458 | 9/1994 | European Pat. Off. . |
| 0635963 | 1/1995 | European Pat. Off. . |
| 93/11626 | 6/1993 | WIPO . |

OTHER PUBLICATIONS

Finnish Office Action and English Translation thereof dated 11 Jul. 1995, Nokia Mobile Phones, Ltd., Application No. 944109.

*Primary Examiner*—Dwayne Bost
*Assistant Examiner*—Nay Maung
*Attorney, Agent, or Firm*—Perman & Green, LLP

[57] ABSTRACT

The invention relates to an arrangement for securing the SIM card (6) in a mobile telephone. By means of the arrangement according to the invention the SIM card (6), which is normally held in place by the spring force exerted by a spring (11) attached to the battery (10) of the telephone, will remain in place while the battery (10) is in place and also while the battery (10) is being removed from the mobile telephone frame (1). This is accomplished by including in the telephone frame a protrusion (8), behind which the SIM card (6) is locked as a result of said spring force. The arrangement according to the invention can advantageously be applied to portable mobile telephones with SIM cards (SIM, Subscriber Identity Module).

8 Claims, 3 Drawing Sheets

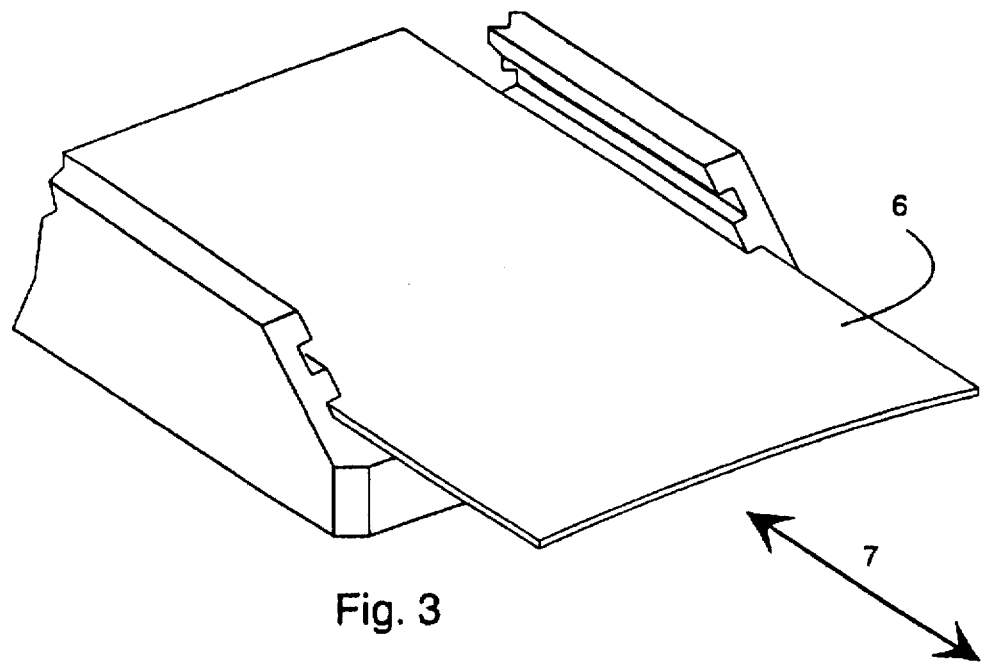
Fig. 3
Fig. 4a
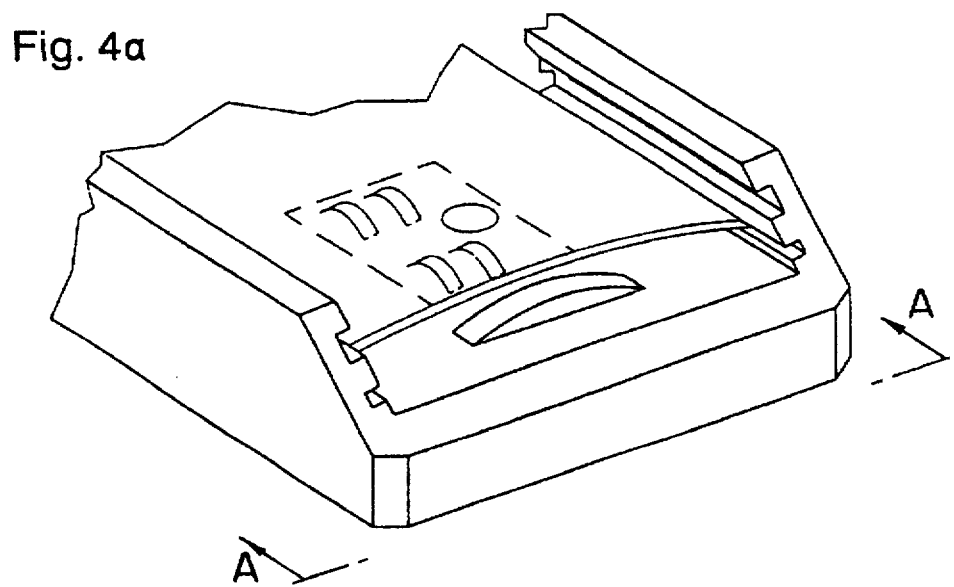
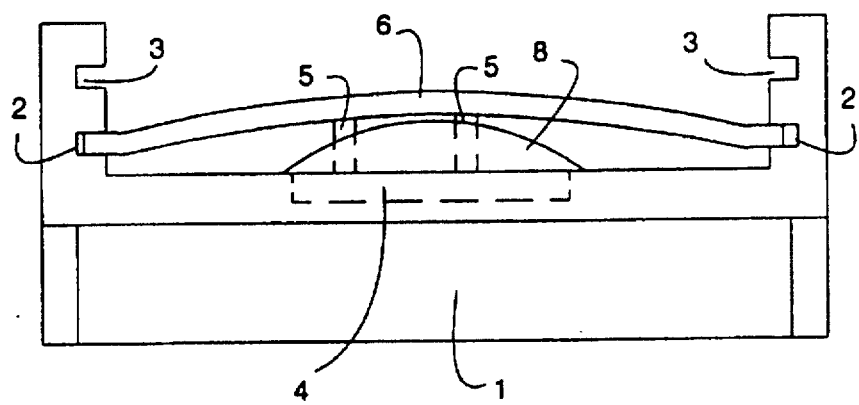
Fig. 4b

ARRANGEMENT FOR SECURING THE SIM CARD IN A MOBILE TELEPHONE

FIELD OF THE INVENTION

The invention relates to an arrangement for securing the SIM card in a mobile telephone. The arrangement according to the invention can be applied to any portable mobile telephones with subscriber-specific SIM cards (SIM, Subscriber Identity Module).

BACKGROUND OF THE INVENTION

The International Organization for Standardization (ISO) has issued specifications for a subscriber-specific SIM connection to be used in mobile phones, using an approximately credit-card sized SIM card. A telecommunication device that is generally referred to as the Mobile Equipment (ME) has a SIM connector by means of which it connects to and recognizes the subscriber-specific SIM card that is brought into contact with it.

A widely used arrangement that enables the SIM card to be attached to a mobile telephone has been to provide the mechanical frame or casing of the telephone with a pair of grooves, into which the SIM card can be slid longitudinally with one end first. On the surface of the mobile telephone facing the SIM card there is a SIM connector, with a number of preferably flexible connector lugs that make an electrical contact with the contact pads on the respective surface of the SIM card. Another pair or even the same pair of grooves has usually been used to slide the rechargeable battery unit of the mobile phone into place so that once properly installed, it essentially covers the SIM card. In the battery unit there is usually included a spring that exerts a force against the surface of the mobile telephone or the SIM card while the battery unit is in place, in order to keep the battery unit (and the SIM card) tightly fastened.

The problem in the above explained use of a SIM card has been that, when the battery of the mobile telephone is detached from the frame of the mobile telephone, the SIM card tends to slide over the connector lugs. Since there is capacitive energy, stored in the telephone, the SIM card is easily damaged while sliding over the connector lugs. Also, the sliding movement causes unnecessary wear to the contact pads and may remove small pieces of conductive material that end up making short circuits between the pads.

SUMMARY OF THE INVENTION

An object of the present invention is to provide, for securing the SIM card in a mobile telephone, an arrangement by means of which the SIM card in a mobile telephone will remain in place while the battery of the mobile telephone is being detached from the frame of the mobile telephone. To achieve this, the arrangement according to the invention is characterized in that the frame of the mobile telephone has a protrusion against which the edge of the SIM card will rest when the battery of the mobile telephone is in place and which protrusion will keep the SIM card in place when the battery is being removed from the mobile telephone frame by sliding, which protrusion will prevent the card from sliding together with the battery over the connector lugs.

BRIEF DESCRIPTION OF THE DRAWINGS

A preferred embodiment of the invention is described below in detail, by the way of example and with reference to the accompanying figures, in which FIG. 3 depicts the mobile telephone of FIG. 1 with a partially inserted SIM card, FIG. 4a depicts the mobile telephone of FIG. 1 with an inserted SIM card, FIG. 4b depicts the mobile telephone with the inserted SIM card, as shown in FIG. 4a, viewed along line A—A.

DETAILED DESCRIPTION OF THE INVENTION

Figure 1:
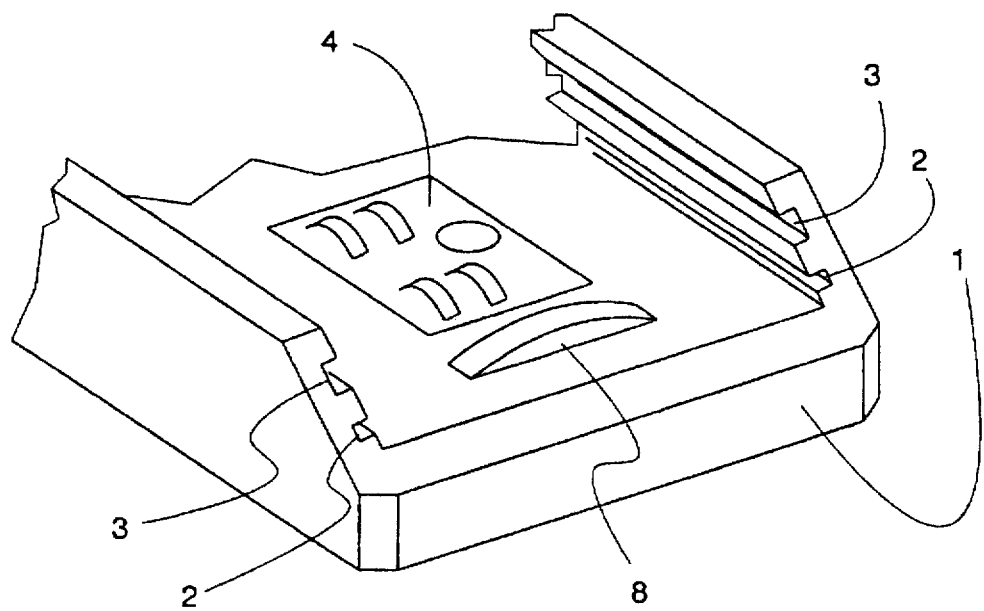
FIG. 1 depicts a part of a mobile telephone with an arrangement according to the invention for securing the SIM card.

FIG. 1 shows a part of a mobile telephone with an arrangement according to the invention for securing the SIM card. The frame 1 of the mobile telephone comprises a first pair of grooves 2, into which a SIM card (not shown in FIG. 1) may be slid, and a second pair of grooves 3, into which a battery unit (not shown in FIG. 1) may be slid. Additionally, the mobile telephone of FIG. 1 comprises a SIM connector 4, facing upwards, when the telephone is in the illustrated position, and next to it, a convex protrusion 8, the object of which is explained a few paragraphs later.

Figure 2:
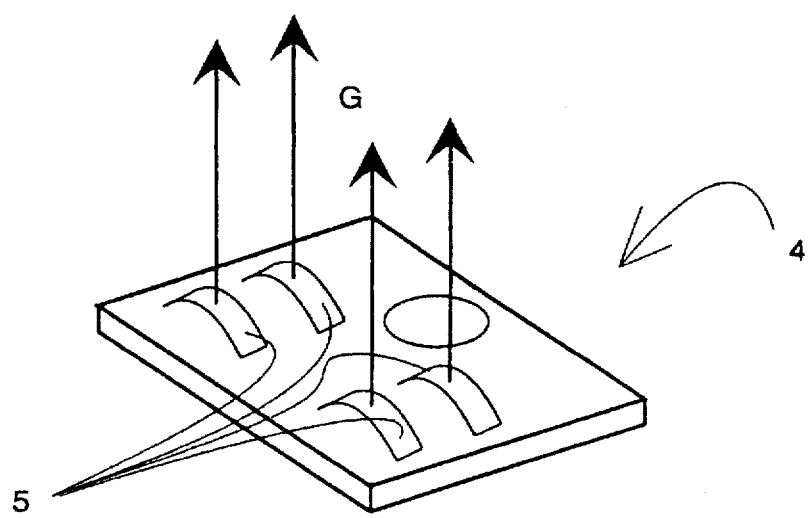
FIG. 2 is an enlarged detail of the structure shown in FIG. 1.

The SIM connector 4 is shown separately and enlarged in FIG. 2. Its dimensioning conforms to the applicable ISO standards and it comprises a number of flexible connector lugs 5. If pressed from above, said connector lugs act as small springs and exert a corresponding force G upwards against the pressing body. The force G is illustrated with arrows in FIG. 2.

The SIM card 6 is inserted into the grooves 2 in the frame 1 of the mobile telephone by sliding it in from one end of the mobile telephone. A partially inserted SIM card 6 is depicted in FIG. 3, where the sliding direction of the SIM card 6 is indicated by an arrow 7. The SIM card 6 is made of flexible material, preferably plastic, and as it is slid into place, it touches the connector lugs of the SIM connector (not shown in FIG. 3) and is slightly bended outwards by the force G (not shown in FIG. 3).

Once fully inserted, like in FIGS. 4a and 4b, the SIM card 6 remains bended outwards because of the pushing force G (not shown in FIG. 4a and 4b) caused by the connector lugs of the SIM connector 4 (shown in FIG. 4b). In addition to bending the SIM card 6, the pushing force ensures good electrical contact between the connector lugs and the respective contact pads (not shown in FIGS. 4a and 4b) on the lower surface of the SIM card.

Figure 5:
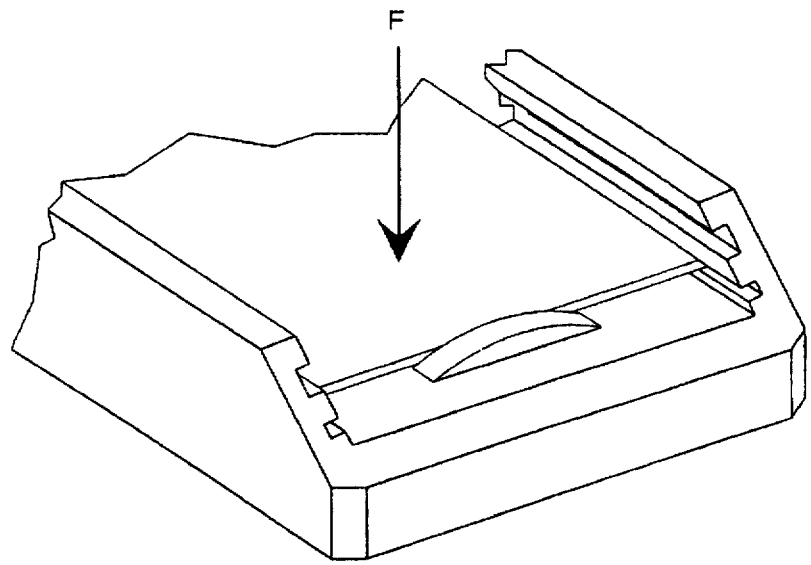
FIG. 5 depicts the arrangement according to FIG. 4 with a vertical force pressing the SIM card.
Figure 6:
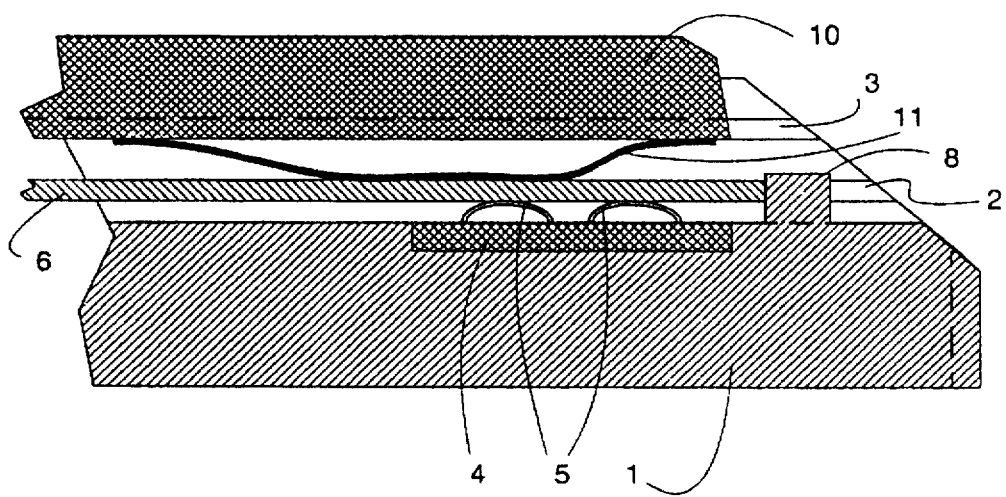
FIG. 6 is a cross-sectional view of the arrangement of FIG. 5 with a battery attached to the mobile telephone.

Next, with reference to FIGS. 5 and 6, the battery, unit 10 of the mobile telephone is slid into place using the second pair of grooves 3 in the frame 1. As explained previously in the description of the state of the art, the battery unit 10 comprises a spring 11 that, when pushed, exerts a force against the body next to it. In the arrangement of FIG. 5, the battery unit is not shown for reasons of clarity, but the force F exerted by its spring is indicated by an arrow. The force F pushes the SIM card 6 against the SIM connector 4 making the SIM card 6 essentially flat. Thereby, the edge of the SIM card 6 is locked behind the protrusion 8 that is formed in the frame 1. This is shown more clearly in the cross-sectional illustration of FIG. 6. Even if the battery, unit 10 is now slid in the direction of the grooves 3, the SIM card 6 cannot move as long as the force F pushes it downwards. Only after the battery unit 10 has disengaged from the grooves 3, the SIM card 6 is again bended upwards by the spring force of the connector lugs 5, like in FIGS. 4a and 4b, whereupon the card 6 can be easily slid over the protrusion 8. The protrusion 8 is preferably designed with a rounded upper surface as in the Figures, so that the shape of the protrusion 8 will correspond to the bent inner surface of the card 6, when the card 6 is bent by the spring force of the connector lugs 5.

With the arrangement according to the invention, the SIM card in a mobile telephone will remain in place while the battery of the mobile telephone 1 is being detached from the mobile telephone frame 1. A second embodiment of the invention would be one in which the grooves guiding the movement of the SIM card would be slightly more far away from the surface housing the SIM connector. Thereby the SIM card would not be in contact with the connector lugs during its insertion, but with the battery attached, the spring of the battery would bend the SIM card downwards (regarding the position shown in the Figures) resulting in a bended card that both touches the connector lugs and is locked behind the protrusion. This second embodiment has the drawback that during normal operation, the SIM card would have to be in a bended position, which might result in permanent deformation and damage to the SIM circuitry.

The invention is simple to implement and does not require extra parts. The arrangement according to the invention ensures that the SIM card 6 will not be able to move in an uncontrolled manner.

We claim:

1. An arrangement for securing a SIM card (6) in a mobile telephone, the arrangement comprising a mobile telephone casing frame (1) with guiding means (2) for inserting said SIM card into said mobile telephone casing frame (1) and a SIM connector (4) with connector lugs (5) for making contact with said SIM card (6) after the insertion of said SIM card (6) into said mobile telephone casing frame (1) using said guiding means (2), characterized in that said mobile telephone also comprises a protrusion (8) as a part of said mobile telephone casing frame (1), and the relative position of said guiding means (2), said protrusion (8) and said connector lugs (5) is arranged such that when said SIM card (6) is inserted into said mobile telephone casing frame (1) using said guiding means (2) a force is applied to said SIM card to cause a flexible deformation in the shape of said SIM card (6) such that said SIM card (6) is enabled to slide over said protrusion (8), and when said SIM card (6) is fully inserted into said mobile telephone casing frame (1) and a pressing force (F) is introduced to urge said SIM card (6) toward said connector lugs (5), said SIM card takes a position in which said protrusion hinders said SIM card (6) from moving along said guiding means (2).

2. A securing arrangement according to claim 1, characterized in that when said SIM card (6) is fully or partially inserted into said mobile telephone casing frame (1) using said guiding means (2), said connector lugs (5) exert the force to cause the flexible deformation in the shape of said SIM card (6).

3. A securing arrangement according to claim 1, characterized in that said protrusion (8) is designed so that its shape corresponds to a bent inner surface of said SIM card (6) when said SIM card (6) is in its deformed shade.

4. An arrangement for securing a SIM card in a mobile telephone, comprising:

a mobile telephone casing frame having a protrusion and a guiding means, said guiding means for directing said SIM card into said mobile telephone casing frame; and a SIM connector having connector lugs, said connector lugs for making contact with said SIM card and for causing a flexible deformation in the shape of said SIM card as said SIM card is inserted into said mobile telephone casing frame;

wherein when said SIM card is inserted into said mobile telephone casing frame said protrusion, said guiding means, and said connector lugs are disposed to cause said connector lugs to apply a force to said SIM card resulting in a flexible deformation in the shape of said SIM card such that said SIM card is enabled to slide over said protrusion, and when a pressing force (F) is applied to said SIM card said pressing force urges said SIM card toward said connector lugs such that said protrusion hinders said SIM card from moving along said guiding means.

5. A securing arrangement as in claim 4, further comprising:

a rechargeable battery unit; and a spring disposed upon said rechargeable battery unit;

wherein when said rechargeable battery unit is installed into said mobile telephone casing frame said spring applies said pressing force (F) to said SIM card.

6. A securing arrangement as in claim 4, wherein said protrusion has an outer, curved surface, said outer, curved surface corresponding to a curvature of said SIM card when said SIM card has the deformed shape.

7. A method for inserting and retaining an electronic card in a radiotelephone, comprising the steps of:

sliding the electronic card through an opening in a case of the radiotelephone, the step of sliding passing the electronic card over a protrusion disposed within the opening until the electronic card is fully inserted into an operating position behind the protrusion;

electrically coupling the fully inserted electronic card to a plurality of electrical contacts, the contacts exerting a first force on a first surface of the electronic card for bowing the electronic card by an amount sufficient to enable the electronic card to be withdrawn from the enclosure by passing the electronic card back over the protrusion and back through the opening; and retaining the electronic card in the operating position by exerting a second force on a second surface of the electronic card that is opposite the first surface, the second force being sufficient to counteract at least a portion of the first force so that the amount of bowing is reduced to an extent that the electronic card cannot be passed over the protrusion.

8. A method as in claim 7, wherein the step of retaining includes a step of inserting a battery module into the radiotelephone, the battery module including a spring for exerting the second force on the electronic card.

* * * * *